UNITED STATES PATENT OFFICE.

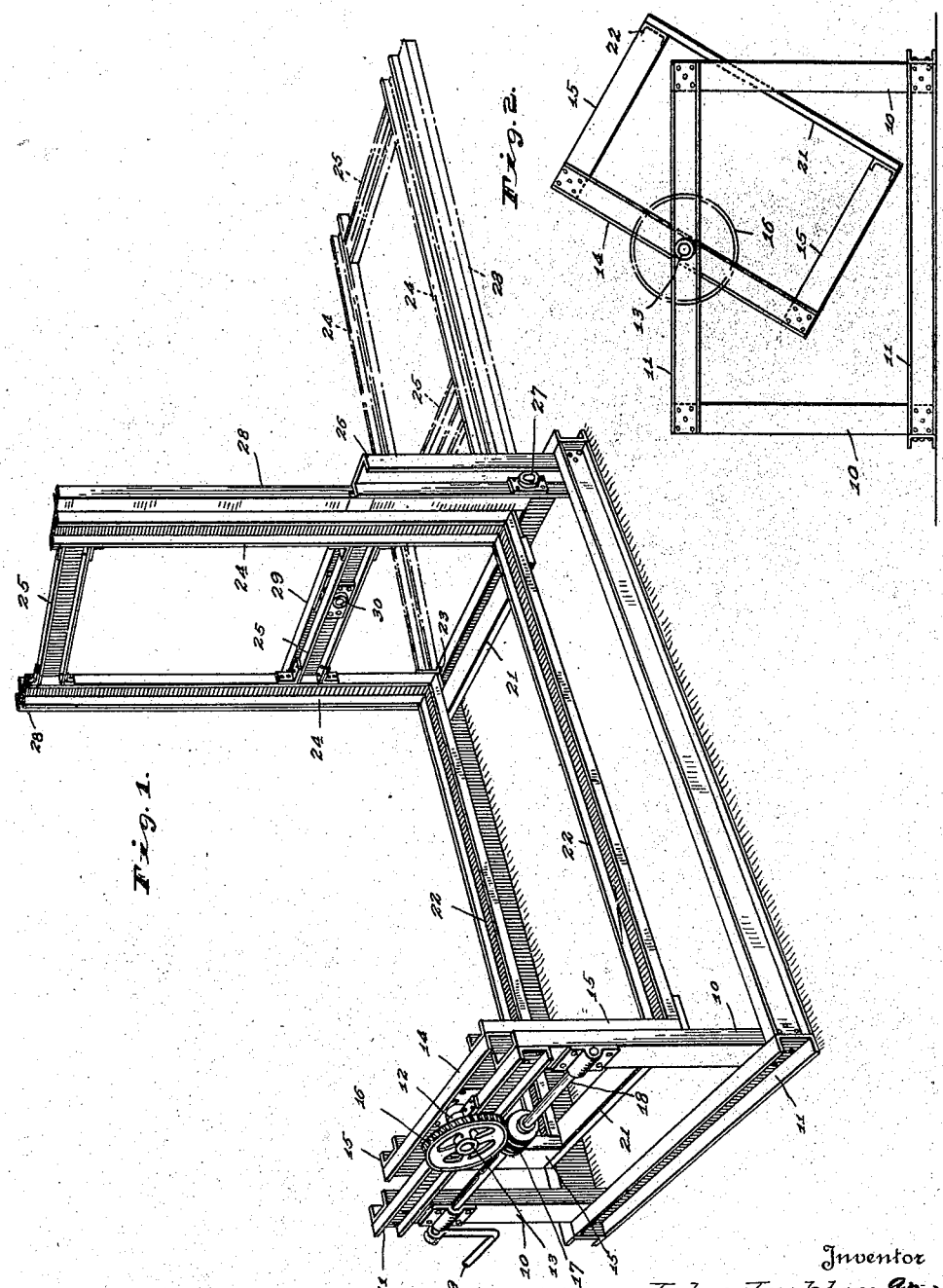

JOHN IMBLER AND SAMUEL IMBLER, OF CARMEL, INDIANA.

AUTOMOBILE REPAIR DERRICK.

1,426,386.  Specification of Letters Patent.  Patented Aug. 22, 1922.

Application filed October 18, 1920. Serial No. 417,808.

*To all whom it may concern:*

Be it known that we, JOHN IMBLER and SAMUEL IMBLER, citizens of the United States, residing at Carmel, in the county of Hamilton and State of Indiana, have invented a new and useful Automobile Repair Derrick, of which the following is a specification.

The object of our invention is to produce a simple and efficient apparatus for handling automobiles, by means of which they may be readily tilted for inspection and repair.

The accompanying drawings illustrate our invention. Fig. 1 is a perspective view of an apparatus embodying our invention; Fig. 2 an end elevation.

In the drawings, 10, 10 indicate end posts connected by cross beams 11. Journaled at 12, on upper beam 11, is a stud shaft 13 which is carried by a cross beam 14 which connects posts 15, 15, which form part of a swinging frame and provide trunnion supported members by which the channels 22 are supported at one end. Shaft 13 carries a worm wheel 16 which meshes with a worm 17, on an operating shaft 18, journaled on posts 10 and provided with a crank 19. The posts 15 are connected at their lower ends by a cross beam 21 to which are secured longitudinal channels 22, 22 adapted to receive the wheels of the automobile. Hinged at 23 to the receiving ends of channels 22, are channels 24, 24 suitably connected by cross braces 25 which form a trunnion supported member at the opposite end of the channels 22. Adjacent the receiving ends of channels 22 and the frame formed by channels 24 and cross braces 25, are posts 26, in which is journaled, at 27, in line with hinges 23, a frame 28, provided with a cross arm 29, closely adjacent one of the cross arms 25, and in the same horizontal plane as cross arm 14. The two cross arms 25 and 29 are connected by a trunnion 30, which is axially alined with shaft 13. By the above arrangement, the two frames 28—29 and 24—25 may be swung down to the position indicated in dotted lines in Fig. 1, so as to form an inclined runway, over which the automobile may be moved onto channels 22. Thereupon, the structure 24—25 and 28—29 may be swung upwardly on hinges 23 and trunnions 27 to the position indicated in full lines in Fig. 1, the automobile standing on channels 22. Thereupon, after the car has been chained down to the channels in any suitable manner, either by hook, clamps, chains or otherwise, the cradle consisting of the end structure 14—15, channels 22, cross beams 21 and structure 24—25 may be swung upon the horizontal axis formed by shaft 13 and trunnion 30, so that the under parts of the automobile become readily accessible.

We claim as our invention:

1. The combination with a suitable support, of a swinging cradle for vehicles, comprising a runway, a pair of depending trunnion supported members by which the runway is supported on said support, one of said depending members being hinged to the runway upon an axis substantially at right angles to the trunnions, and means connected to the trunnion of the non-hinged depending support for swinging the cradle upon its trunnions.

2. The combination with a suitable support, of a swinging cradle for vehicles, comprising a runway, and a pair of depending trunnion supported members by which the runway is supported on said support, one of said depending members being hinged to the runway upon an axis substantially at right angles to the trunnions.

3. The combination with a suitable support, of a cradle comprising a runway, a depending trunnion support for one end of said runway trunnioned on said support, a second runway pivoted at one end of the first-mentioned runway upon an axis at right angles to the axis of the trunnion, and a depending support trunnioned upon the second mentioned runway and on said support in alinement with the trunnion of the first-mentioned depending support and hinged to the first-mentioned runway upon an axis in alinement with the axis of the second mentioned runway.

4. The combination with a suitable support, of a cradle comprising a runway having supporting end members extending vertically with respect to the runway and trunnioned near their upper ends on said support one of said end members being hinged to one end of the runway to permit it to be lowered into substantial alinement with the runway.

5. The combination with a support having vertically extending end members one of said end members being hinged on the support to permit it to be lowered into horizontal position, a cradle comprising runways and vertically extending end members connected to said runways and trunnioned on the end members of the support one of said end members being hinged to the end of the runway to permit it to be lowered with the end of the support to substantial horizontal position.

In witnesss whereof, we have hereunto set our hands at Indianapolis, Indiana, this 15th day of October, A. D. one thousand nine hundred and twenty.

JOHN IMBLER.
SAMUEL IMBLER.